US012779789B2

(12) United States Patent
Foster et al.

(10) Patent No.: US 12,779,789 B2
(45) Date of Patent: Nov. 3, 2026

(54) VIBRATION WELDING GROOVE

(71) Applicant: Flex-N-Gate Advanced Product Development, LLC, Windsor (CA)

(72) Inventors: Brian Foster, Warren, MI (US); Jeffrey Dingess, Allen Park, MI (US); Chin Yi, Allen Park, MI (US)

(73) Assignee: FLex-N-Gate Advanced Product Development, LLC, Windsor (CA)

( * ) Notice: Subject to any disclaimer, the term of this patent is extended or adjusted under 35 U.S.C. 154(b) by 287 days.

(21) Appl. No.: 18/598,334

(22) Filed: Mar. 7, 2024

(65) Prior Publication Data

US 2024/0316686 A1 Sep. 26, 2024

Related U.S. Application Data

(60) Provisional application No. 63/491,467, filed on Mar. 21, 2023.

(51) Int. Cl.
*B29C 65/08* (2006.01)
*B23K 20/10* (2006.01)
(Continued)

(52) U.S. Cl.
CPC .............. *B29C 65/08* (2013.01); *B23K 20/10* (2013.01); *B29C 65/0618* (2013.01);
(Continued)

(58) Field of Classification Search
None
See application file for complete search history.

(56) References Cited

U.S. PATENT DOCUMENTS 3,276,941 A * 10/1966 Burns ............... B29C 66/73921 156/304.6
3,501,110 A * 3/1970 Green ................... B29C 66/612 264/68
(Continued)

FOREIGN PATENT DOCUMENTS

CN 205190080 U * 4/2016
CN 209324486 U * 8/2019
(Continued)

OTHER PUBLICATIONS

Machine Translation of CN110274372A, Sep. 2019 (Year: 2019).*
(Continued)

*Primary Examiner* — Jeffrey A Vonch
(74) *Attorney, Agent, or Firm* — Avek IP, LLC

(57) ABSTRACT

A vibration welding groove system may include a first component having a joining surface with a groove region, where the groove region comprises a groove formed in the joining surface. The first component includes a base region lacking the groove in the joining surface and a transition region located between the groove region and the base region. The transition region has a tapering of the groove to provide a smooth transition from the groove region to the base region. The vibration welding groove system may further include a second component having a weld leg extending from a main body, where the groove of the first component comprises a shape configured to nudge the weld leg towards a center of the groove during joining of the first component with the second component.

5 Claims, 9 Drawing Sheets

(51) Int. Cl.

| | |
|---|---|
| ***B29C 65/00*** | (2006.01) |
| ***B29C 65/06*** | (2006.01) |
| ***B29K 101/12*** | (2006.01) |
| *B29C 65/78* | (2006.01) |
| *B29L 31/00* | (2006.01) |
| *B29L 31/30* | (2006.01) |

(52) U.S. Cl.

CPC ........ *B29C 66/302* (2013.01); *B29C 66/3022* (2013.01); *B29C 66/30223* (2013.01); *B29C 66/71* (2013.01); *B29C 66/73921* (2013.01); *B29C 65/7814* (2013.01); *B29C 66/12441* (2013.01); *B29C 66/12463* (2013.01); *B29C 66/1312* (2013.01); *B29C 66/322* (2013.01); *B29C 66/54* (2013.01); *B29C 66/8322* (2013.01); *B29K 2101/12* (2013.01); *B29L 2031/30* (2013.01); *B29L 2031/747* (2013.01)

(56) References Cited

U.S. PATENT DOCUMENTS 5,520,775 A * 5/1996 Fischl .................. B29C 66/545 425/174.2
6,054,072 A 4/2000 Bentley et al.
6,152,350 A * 11/2000 Hayashi ................ B29C 65/749 228/103
6,236,639 B1 * 5/2001 Selg .................. G11B 23/0316 720/728
6,364,513 B1 4/2002 Fong et al.
8,210,695 B2 7/2012 Roth et al.
8,393,766 B2 3/2013 Pastrick
2002/0136856 A1 * 9/2002 Sugimura ......... B29C 66/30223 428/60
2003/0062092 A1 * 4/2003 Nagai ................. F15B 13/0828 137/884
2003/0062665 A1 * 4/2003 Urlaub .................... B29C 65/08 269/309
2004/0200450 A1 * 10/2004 Tanikawa ............ B29C 66/8322 123/184.42
2005/0089159 A1 * 4/2005 Schrack .................. B29C 66/21 379/433.13
2005/0173055 A1 * 8/2005 Okuda .............. B29C 66/73921 156/272.8
2008/0156412 A1 * 7/2008 Enokida ................ B29C 66/545 156/73.6
2013/0186737 A1 * 7/2013 Inotsuka ............... B29C 66/342 200/8 R
2015/0292664 A1 * 10/2015 Mann ..................... B23K 26/20 156/308.2
2016/0176103 A1 * 6/2016 Rousseau ............ B29C 66/7392 403/270
2016/0184933 A1 * 6/2016 Armstrong ............ B23K 11/08 156/308.2
2017/0015051 A1 * 1/2017 Kurita ................. B29C 65/1635
2017/0370373 A1 * 12/2017 Rausch ............... F04D 29/2227
2018/0343757 A1 * 11/2018 I .............................. B29C 65/08
2019/0054562 A1 * 2/2019 Miyashiro ......... B29C 66/81435
2019/0081431 A1 * 3/2019 Heyman .............. H01R 31/065
2019/0372265 A1 * 12/2019 Heyman ............... B29C 66/542
2021/0316513 A1 * 10/2021 Möller .............. B29C 66/81465
2022/0242053 A1 * 8/2022 Culbertson ............. B29C 65/08
2022/0399690 A1 * 12/2022 Galla ................. H01R 43/0207
2022/0410496 A1 * 12/2022 Glavaski .................. B29B 9/10
2023/0155225 A1 * 5/2023 Jang .................... H01M 50/204 429/99

FOREIGN PATENT DOCUMENTS

CN 110274372 A * 9/2019 ............. B29C 65/08
DE 3835640 A1 * 4/1990 ........... B29C 65/608
DE 4126903 A1 * 3/1992 ........... B29C 66/322
DE 19950512 A1 * 5/2001 ......... B29C 66/1122
DE 10012782 A1 * 9/2001 ......... B29C 66/1286
DE 10160542 A1 * 7/2003 ........... B29C 66/542
DE 102008060731 A1 * 6/2009 ....... B29C 66/12463
DE 102008036605 A1 * 2/2010 ....... B29C 66/12445
DE 202013007706 U1 * 12/2013 .............. F21S 41/28
EP 1072391 A2 * 1/2001 ........... B29C 66/474
EP 1344630 A2 * 9/2003 ....... B29C 66/12463
FR 2700384 A1 7/1994
FR 2713540 A1 * 6/1995 ........... B29C 66/632
GB 2327118 A * 1/1999 ......... B29C 66/1142
JP 51053577 A * 5/1976
JP S5153577 A * 5/1976
JP S57108922 U * 7/1982
JP 58074315 A * 5/1983
JP S58107816 U * 7/1983
JP S58212913 A * 12/1983
JP S6114935 A * 1/1986
JP S62221526 A * 9/1987
JP H0516241 A * 1/1993 ........... B29C 66/114
JP H0518391 A * 1/1993 ......... B29C 65/7855
JP H0518391 U * 3/1993
JP H0556424 U * 7/1993 ......... B29C 66/3022
JP H05177711 A * 7/1993 ....... B29C 66/12443
JP H05309735 A * 11/1993 ......... B29C 65/0618
JP H0726974 U * 5/1995 ............. B29C 66/54
JP H08142197 A * 6/1996 ......... B29C 65/7829
JP H09234794 A * 9/1997 ......... B29C 66/3022
JP H1080952 A * 3/1998 ........... B29C 66/124
JP H10193460 A * 7/1998 ....... B29C 66/30223
JP H1158865 A * 3/1999
JP 2000048785 A * 2/2000 ....... B29C 66/24244
JP 2000128130 A * 5/2000 ....... B29C 66/73921
JP 2000135740 A * 5/2000 ........... B29C 66/324
JP 2001313014 A * 11/2001 ............. B29C 65/08
JP 2002245993 A * 8/2002 ....... B29C 66/12841
JP 2002321283 A * 11/2002 ........... B29C 66/534
JP 2004063331 A * 2/2004 ........... B29C 66/828
JP 2004316468 A * 11/2004 ....... B29C 66/30223
JP 2004351839 A * 12/2004 ......... B29C 65/7841
JP 2007001116 A * 1/2007 ....... B29C 66/81431
JP 2010188527 A * 9/2010 ....... B29C 66/12449
JP 2011016281 A * 1/2011 ....... B29C 66/24221
JP 2013107227 A * 6/2013 ......... B29C 65/7814
JP 2018178795 A * 11/2018 ............. F04D 17/10
KR 20040085478 A * 10/2004
KR 20050110094 A * 11/2005 ........... B29C 66/534
TW I250089 B * 3/2006 ......... B29C 66/1142
WO WO-0147691 A1 * 7/2001 ....... B29C 66/30223
WO WO-2005098241 A1 * 10/2005 ............... B64C 3/26
WO WO-2010023241 A1 * 3/2010 ....... B29C 66/24244

OTHER PUBLICATIONS

Machine Translation of DE202013007706U1, Dec. 2013 (Year: 2013).*
Machine Translation of FR2713540A1, Jun. 1995 (Year: 1995).*
Machine Translation of JP2000048785A, Feb. 2002 (Year: 2002).*
Machine Translation of JP2000135740A, May 2000 (Year: 2000).*
Machine Translation of JPS5153577A, May 1976 (Year: 1976).*
Machine Translation of JPS5874315A, May 1983 (Year: 1983).*
Sonic Power, Part Design for Ultrasonic Welding, May 2016 (Year: 2016).*
Yan et al., The Effects of Energy Director Shape on Temperature Field during Ultrasonic Welding of Thermoplastic Composites, Sep. 2007, Key Engineering Materials, vols. 353-358, pp. 2007-2010 (Year: 2007).*
Machine Translation of JP2011016281A, Jan. 2011 (Year: 2011).*
Herrmann Ultrasonics, Ultrasonic welding of plastics, Jan. 2022 (Year: 2022).*
Velazquez, Best Practices for Ultrasonic Welding Joint Design, Apr. 2020, Hermann Ultrasonics, <https://www.youtube.com/watch?v=8xyu03CulHE> (Year: 2020).*
Extended European Search Report dated Sep. 13, 2024, 24 pages, issued in EP Application No. 24165098.5.

* cited by examiner

VIBRATION WELDING GROOVE

CROSS-REFERENCE TO RELATED APPLICATIONS

This application claims the benefit of priority of U.S. Provisional Patent Application No. 63/491,467 entitled Vibration Weld Tongue and Groove Weld Region and filed on Mar. 21, 2023, the disclosure of which is herein incorporated by reference in its entirety.

BACKGROUND

1. Field

Embodiments of the invention relate generally to vibration welding, and more specifically to a "tongue and groove" design for improved joining of lighting assembly components via vibration welding.

2. Related Art

Vibration welding is a known manufacturing process used to join parts together. For example, U.S. Pat. No. 6,054,072 to Bentley et al. discloses a tongue and groove interface for bonding a transparent plastic article to an opaque plastic article via infrared radiation. U.S. Pat. No. 6,364,513 to Fong et al. discloses a tongue and groove interface for joining a lens to the housing of a lighting device via vibration welding. U.S. Pat. No. 8,210,695 to Roth et al. discloses a tongue and groove interface for joining parts of a rearview mirror assembly via vibration welding. U.S. Pat. No. 8,393,766 to Pastrick discloses a tongue and groove interface for joining parts of a lighted external mirror assembly using vibration welding.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In certain aspects, a vibration welding groove system for improved bonding of a first component with a second component via a vibration welding process includes: a first component, including: a joining surface; a groove region, wherein the groove region includes a groove formed in the joining surface; a base region lacking the groove in the joining surface; and a transition region located in the joining surface between the groove region and the base region, wherein the transition region includes a tapering of the groove to provide a smooth transition from the groove region to the base region; and a second component having a weld leg extending from a main body, wherein the groove of the first component includes a shape configured to nudge the weld leg towards a center of the groove during joining of the first component with the second component.

In certain aspects, the groove includes an opening having a width that is larger than a depth of the groove.

In certain aspects, the depth of the groove is greatest at a mid-line of the groove.

In certain aspects, the groove is symmetrical on opposing sides of the mid-line.

In certain aspects, the mid-line of the groove is aligned with a center line of the first component.

In certain aspects, an outer portion of the groove includes a depression configured to provide a catchment for receiving the weld leg.

In certain aspects, the depression is about 0.2-mm below the joining surface.

In certain aspects, the groove includes a hump inside the depression towards the center of the groove, the hump being configured to nudge the weld leg towards a mid-line of the groove.

In certain aspects, the hump is configured to cause a deflection of the weld leg towards the mid-line of the groove.

In certain aspects, the hump is configured to cause a deformation of the weld leg, thereby bending the weld leg towards the mid-line of the groove.

In certain aspects, the base region is configured for connection with a vibration source for transferring high frequency vibrations to the first component during the vibration welding process.

In certain aspects, the groove includes a contour configured to maintain weld flash within the groove.

In certain aspects, the groove includes a contour shaped to receive the weld leg without excessive deformation of the weld leg.

In certain aspects, the groove is configured to direct a misaligned weld leg towards a center of the groove thereby reducing an amount of sacrificial region of the weld leg upon vibrational welding.

In certain aspects, a depth of the groove is about 1.0-mm to about 1.25-mm below the joining surface.

In certain aspects, a grooved component shaped for improved bonding of the grooved component with a weld leg via a vibration welding process includes: a groove region including a groove, wherein the groove region is located in a joining surface of the grooved component; a base region lacking the groove in the joining surface; and a transition region located in the joining surface between the groove region and the base region, wherein the transition region includes a tapering of the groove to provide a smooth transition from the groove region to the base region; and the groove includes: a bottom portion along a mid-line of the groove; a profile that ascends symmetrically from the bottom portion to the joining surface on opposing sides of the groove; a depression towards outer portions of the groove adjacent the joining surface; and a hump between the depression and the bottom portion.

In certain aspects, the groove is configured to direct a misaligned weld leg towards a center of the groove thereby reducing an amount of sacrificial region of the weld leg upon vibrational welding In certain aspects, the depression is configured to provide a catchment for receiving the weld leg upon misalignment between the weld leg and the bottom portion during joining.

In certain aspects, the hump is configured to deflect the weld leg towards the mid-line of the groove.

In certain aspects, the hump is configured to cause a deformation of the weld leg, thereby bending the weld leg towards the bottom portion of the groove.

BRIEF DESCRIPTION OF THE DRAWING FIGURES

Embodiments of the invention are described in detail below with reference to the attached drawing figures, wherein.

Figure 1A:
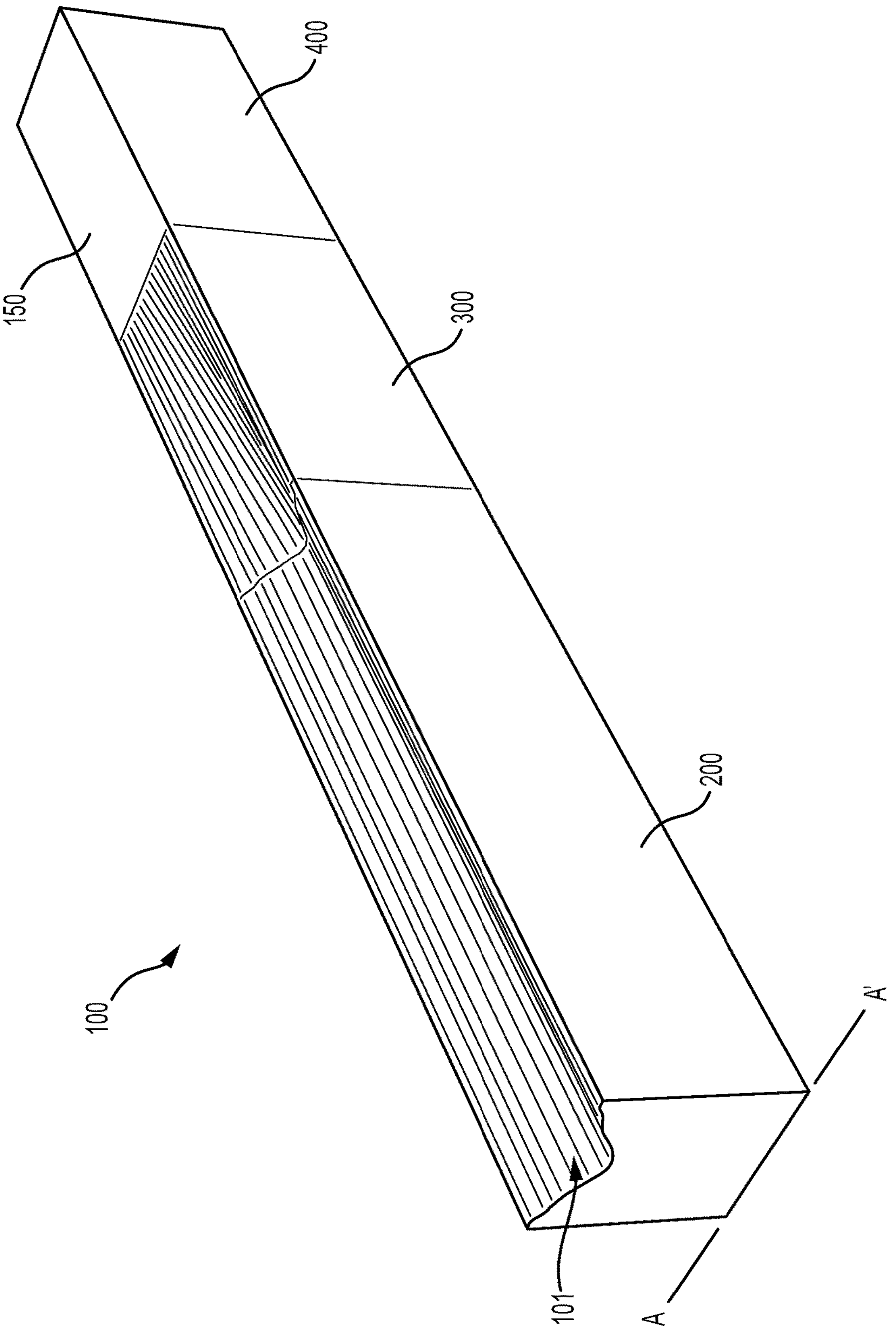
FIG. 1A is a three-dimensional perspective view of a portion of a vibration welding groove formed in a component, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Vibration welding is a welding process that uses high-frequency mechanical vibrations to generate heat and melt the surfaces of two plastic parts to form a bond. The vibration causes friction at the interface between the surfaces of the parts, creating heat sufficient to partially melt the parts along the interface. The melted parts are allowed to cool and solidify, forming a strong, homogeneous bond. Vibration welding can be used to join parts of various sizes, such as automotive interiors and housings for electronic devices, and is valued for its high production rates, reliability, and low cost. Vibration welding is primarily used to join thermoplastic materials, such as polypropylene (PP), polyethylene (PE), acrylonitrile butadiene styrene (ABS), polycarbonate (PC), and others. The choice of material will depend on the specific requirements of the application, including the desired mechanical properties, dimensional stability, and chemical resistance. In addition, the material must have a sufficient melt viscosity and flow behavior to allow for the formation of a consistent and uniform bond. Other factors, such as the size and geometry of the parts, production rates, and cost considerations, will also influence the choice of material for vibration welding.

Embodiments disclosed herein encompass intricate designs that may be incorporated into any number of devices, including but not limited to a lighting assembly for vehicles. Embodiments include advanced vibration welding technology and a unique "tongue and groove" design that accommodates tolerance variations in the dimensional specifications of the individual components, thereby ensuring consistent and reliable final assemblies.

For purposes of description herein, the terms "upper," "lower," "right," "left," "rear," "front," "vertical," "horizontal," "top," "bottom," and derivatives thereof shall be in reference to the orientation of the embodiment as shown in the accompanying figure. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

Figure 1C:
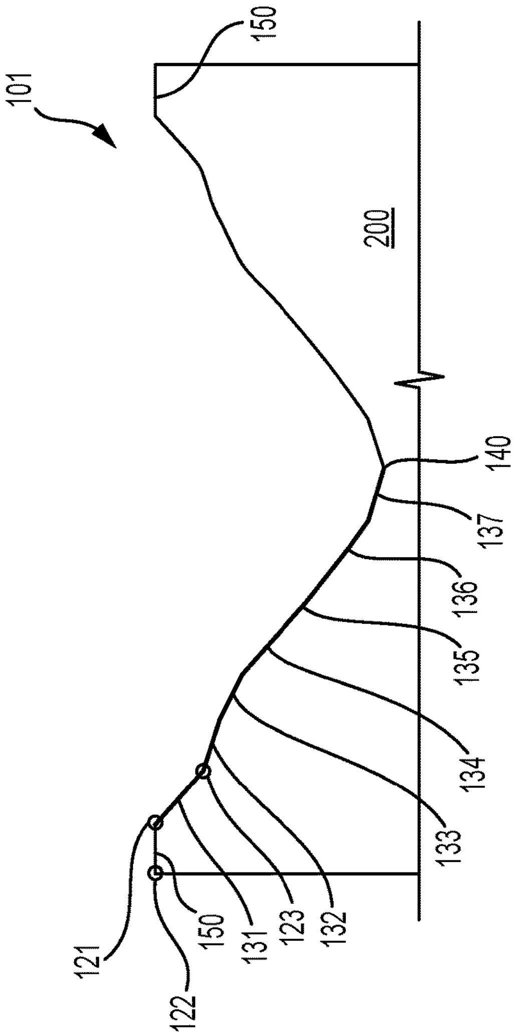
FIG. 1C is a close-up view of the groove profile of FIG. 1B.
Figure 1D:
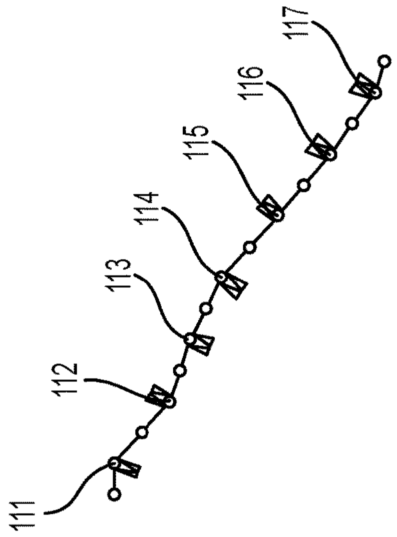
FIG. 1D illustrates an exemplary profile of one side of the groove of FIG. 1B.
Figure 1B:
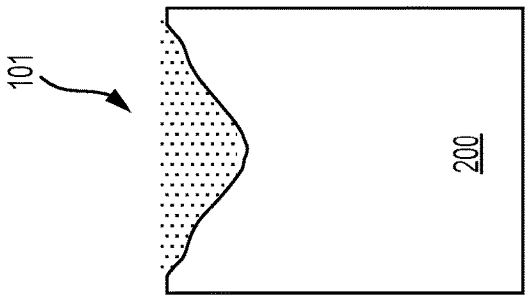
FIG. 1B is a cross-sectional view of the groove taken from the A-A' cross-section location of FIG. 1A.

FIG. 1A, FIG. 1B, and FIG. 1C show a component 100 of a vibration welding groove system as viewed from different perspectives and are best viewed together with the following description.

FIG. 1A illustrates a representative three-dimensional perspective view of the component 100 having a groove 101, comprising three regions: a groove region 200, a transition region 300, and a base region 400. In one embodiment as illustrated in FIG. 1A, the three regions are seamlessly joined together. In embodiments, regions 200, 300, and 400 may be formed from a single piece of material. The groove region 200 comprises a groove 101 formed in a surface and is specifically designed to serve as a vibration welding surface configured to receive a weld leg and to guide the weld leg during a vibration welding process. The shape of the groove 101 is configured to compensate for part variation by assisting with alignment of two parts being welded together, as further described below. The transition region 300 provides a smooth transition between the groove region 200 and the base region 400. A top surface 150 exists outside of groove 101. Top surface 150 is for example a joining surface to be joined with another part. Base region 400 includes top surface 150 lacking the groove 101. In embodiments, top surface 150 is a flat surface; however, other features besides the groove may be present in or on top surface 150 without departing from the scope hereof. In embodiments, the base region 400 is connected to a vibration source for transferring high frequency vibrations during the welding process.

FIG. 1B is a cross-sectional view of the groove region 200 taken from the A-A' cross-section location of FIG. 1A. As illustrated in FIG. 1B, the groove 101 is indicated by a dotted area. In embodiments, the component 100 is manufactured by injection molding such that the groove 101 is designed into an injection molded tooling to form the groove 101 during the injection molding process as known to one of skill in the art of plastics manufacturing. In certain embodiments, the groove 101 may alternatively be extruded from the component 100 at the groove region 200 and the transition region 300. In embodiments, an opening of the groove 101 comprises a width that is larger than a depth of the groove 101. A depth of the groove 101 is greatest at the mid-line (i.e., the middle) of the groove 101, which may in embodiments be aligned with a center line of the component 100.

FIG. 1C is a close-up view of the groove 101 from FIG. 1B at the groove region 200. Top surface 150 exists outside the groove 101 between an outer corner 122 and an inner corner 121 within the groove region 200. In embodiments, the top surface 150 in the transition region 300 may expand as the groove 101 tapers until it ends (see FIG. 5) or the top surface may match that of the groove region (see FIG. 1A). In the base region 400, the groove is absent and the top surface 150 extends across to both sides of the component 100. In embodiments, the slope of the groove is symmetrical on opposing sides of the groove mid-line and ascends symmetrically from a bottom portion 140 upwards to the top surface 150. A vertex 123 shown in FIG. 1C indicates a location at which the angle of the slope changes forming a depression as further described below in connection with FIG. 4.

The groove 101 comprises a series of segments 131, 132, 133, 134, 135, 136, and 137, which are contiguous segments that form a profile as best viewed from the cross-sectional close-up view of FIG. 1C. In embodiments, segments 131-137 descend continuously from the inner corner 121 to the bottom portion 140 at a bottom of the groove 101. The bottom portion 140 spans the bottom of the groove 101 along the groove mid-line. The groove 101 provides a sweeping entry for a weld leg of another part to be guided into the bottom portion 140 under clamping pressure applied between the two parts. Each segment, 131 to 137, of the groove region 200 may be independently selected from, but not limited to, a variety of different shapes, including straight lines, elliptical lines, circular lines, parabolic lines, or a combination of these shapes.

FIG. 1D illustrates an exemplary profile of one side of groove 101 having a variety of angles 111, 112, 113, 114, 115, 116, and 117, which are the joint angles between adjacent segments 131-137 of the groove 101. In embodiments, the angles 111-117 are independently selected to be between 90-degrees (i.e., vertical) and 180-degrees (i.e., horizontal). The design specifications for the groove 101 shape may be varied greatly, including the number of segments, the length of each segment, the shape of each segment, and the angles formed between adjacent segments, based on various factors such as the intended application, material characteristics, and fabrication limitations. The illustrated segments in FIG. 1C show the features of the groove 101 at cross-section A-A' of FIG. 1A; however, other portions of the groove 101 may have different profiles (i.e., different angles 111-117 and/or different segments 131-137) and may be designed independently, based on various factors such as the intended application, material characteristics, and fabrication limitations. For example, in the transition region 300, the profile of the groove varies continuously to form a smooth transition between the groove region 200 and the base region 400 that lacks any groove in top surface 150; therefore, the segments become shorter and the angles between the segments vary through the transition region 300 compared to the groove region 200.

The contour of the groove 101 is designed to direct the weld leg to the optimal dimensionally controlled position, maintain weld flash for a visually appealing appearance, and, in the event that the final assembly fails to meet dimensional specifications, provide a welding surface without excessively straining the weld leg 500, as would occur with a straight or more pronounced slope. Weld flash refers to the excess material that results from a welding process and is left on the welded parts after they have cooled and solidified. It is often considered a cosmetic issue, as it can detract from the appearance of the welded components, but it may also have functional implications, as it can interfere with the proper fit and function of the welded parts. In some embodiments, weld flash may be trimmed or removed, either manually or through a secondary manufacturing process, to improve the appearance or functionality of the finished product. The shape of the groove 101 is further described below in connection with FIG. 4.

Figure 2A:
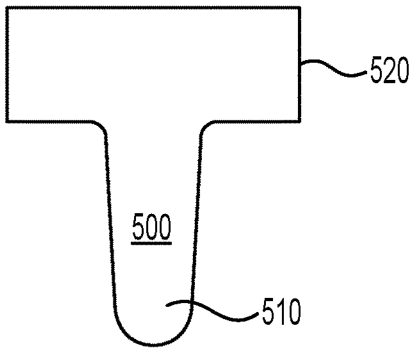
FIG. 2A is a cross-sectional view of an exemplary weld leg for use with the vibration welding groove of FIG. 1A.

FIG. 2A is a cross-sectional view of a weld leg 500 extending from a component 520. Component 520 is a separate component (e.g., a second component) configured for bonding with first component 100. Component 520 may be coupled to other components for welding into an assembly. A tip of the weld leg 500, located at its distal end from component 520, forms a sacrificial region 510. The sacrificial region 510 provides material that is melted for bonding the two parts together (e.g., during vibrational welding).

Figure 2B:
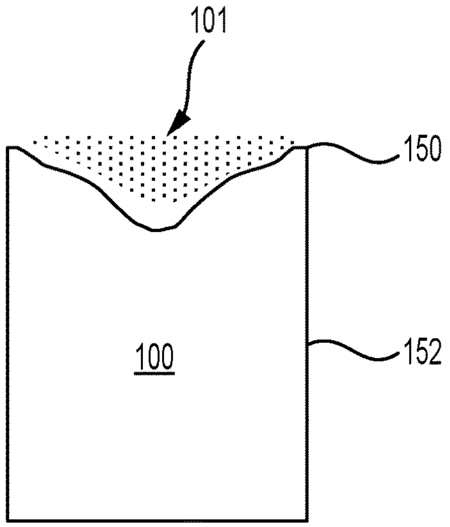
FIG. 2B is a cross-sectional view of the groove of FIG. 1B.

FIG. 2B is a cross-sectional view of the component 100 at the groove region 200. The groove 101 formed in a main body 152 of component 100 and is indicated in FIG. 2B by a dotted area between opposing sides of top surface 150.

Figure 2C:
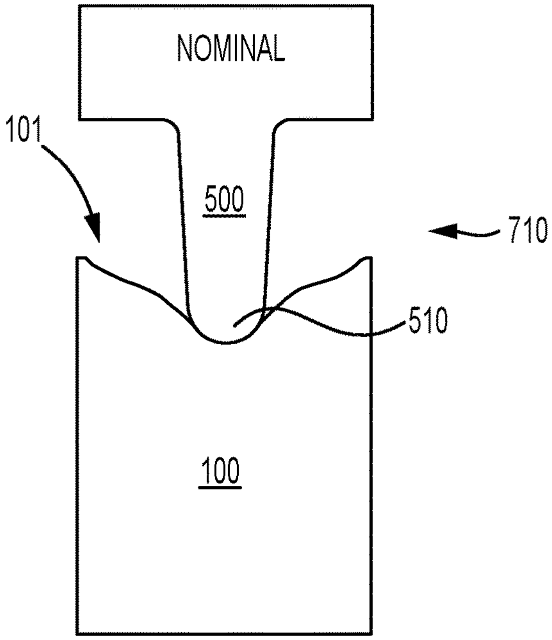
FIG. 2C is a cross-sectional view of a nominal alignment of the weld leg of FIG. 2A and the groove of FIG. 2B before the vibration welding process.

FIG. 2C is a cross-sectional view of a nominal alignment 710 in which the weld leg 500 is nominally aligned with the component 100 before the vibration welding process in the nominal alignment 710. The sacrificial region 510 is centered in the lowest portion of the groove 101, as depicted in FIG. 2C.

Figure 2D:
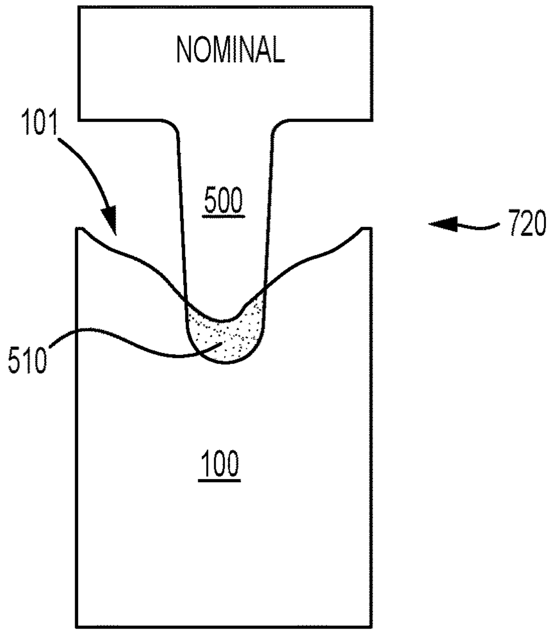
FIG. 2D is a cross-sectional view of the nominal alignment of the weld leg and the groove during the vibration welding process with a sacrificial region.

FIG. 2D is a cross-sectional view of a nominal alignment 720 of the weld leg 500 nominally aligned during the vibration welding process. The sacrificial region 510, shown in FIG. 2D as an overlap area, indicates the portion of material that is melted during vibrational welding.

FIGS. 3A to 3D show cross-sectional views of the component 100 and the weld leg 500 in either nominal or misaligned positions.

Figure 3A:
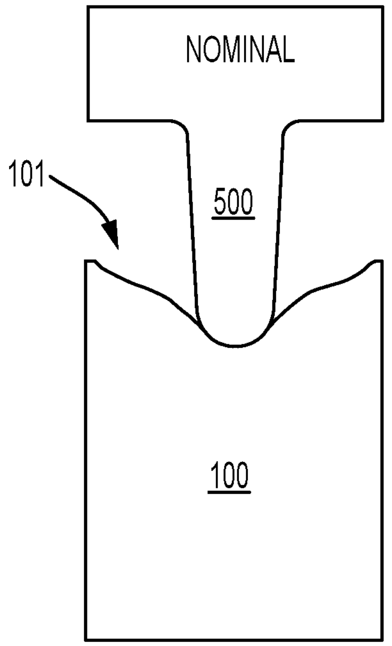
FIG. 3A shows the nominal alignment of the weld leg with the groove before the vibration welding process.
Figure 3B:
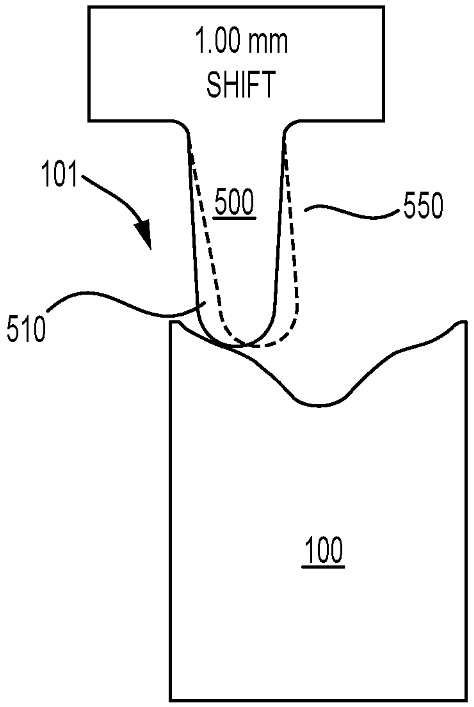
FIG. 3B represents a misalignment of the weld leg with the groove by a relatively large amount.
Figure 3C:
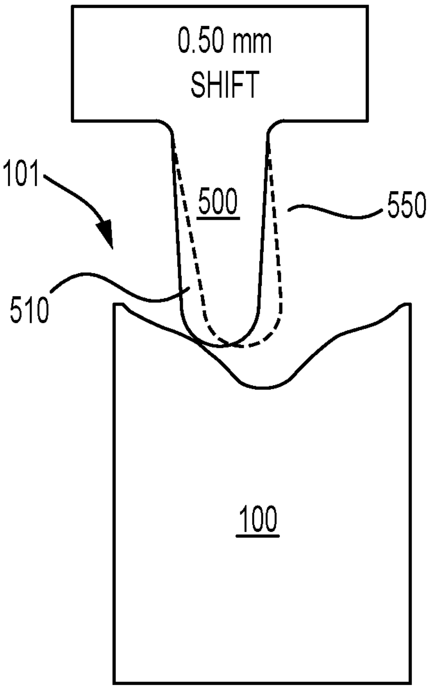
FIG. 3C represents a misalignment of the weld leg with the groove by a smaller amount than that of FIG. 3B.

FIG. 3A shows the nominal alignment of the weld leg 500 with the component 100 prior to the vibration welding process. FIG. 3B shows the weld leg 500 misaligned (e.g., by 1.00-mm) from the mid-line or center of groove 101. As the weld leg 500 is brought into contact with the groove 101, the weld leg is deflected (as represented in dashed lines in FIG. 3B) and deformed towards the center of the groove 101. FIG. 3C shows the weld leg 500 misaligned by 0.50-mm from the center of groove 101. Again, the weld leg is deflected (as represented in dashed lines in FIG. 3C) and deformed towards the center of the groove 101. The groove 101 is shaped with a contour that receives the weld leg without excessive deformation of the weld leg.

Figure 3D:
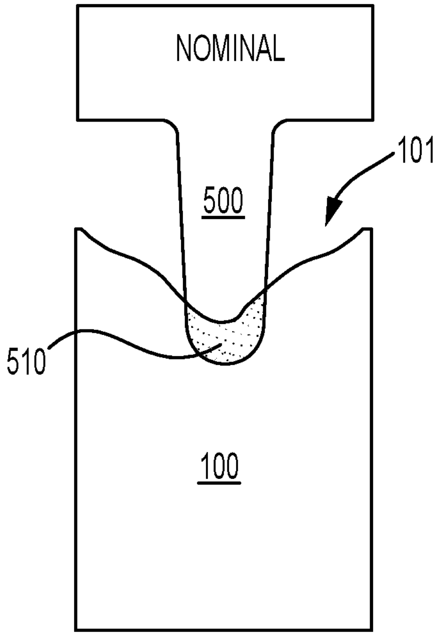
FIG. 3D shows the nominal alignment of the weld leg with the part during the vibration welding process indicating the sacrificial zone.
Figure 3E:
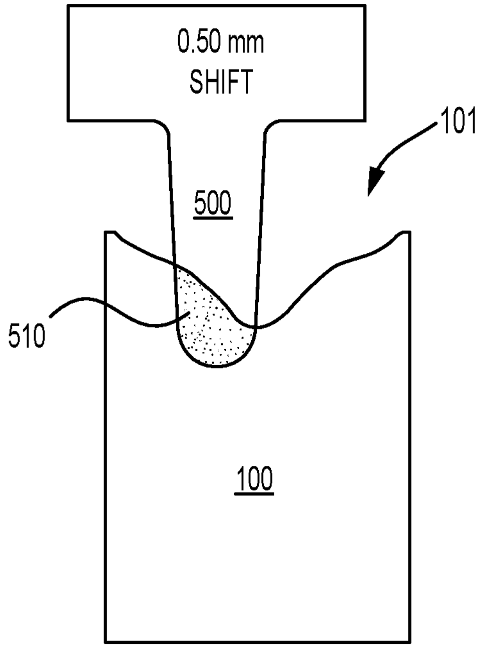
FIG. 3E represents a misalignment of the weld leg by 0.5-mm with the groove region during the vibration welding process.
Figure 3F:
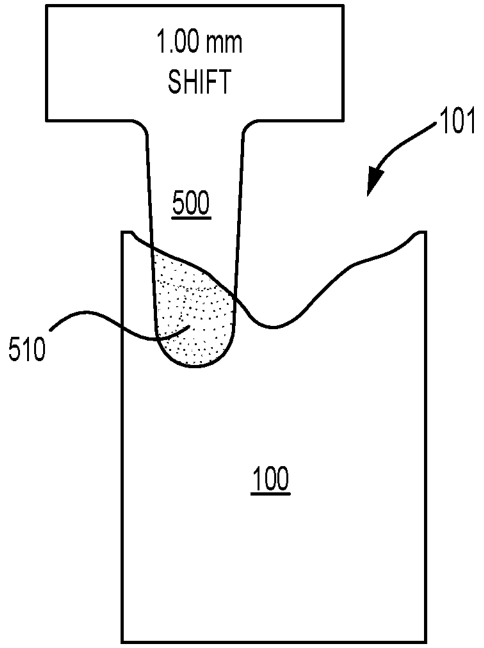
FIG. 3F represents a misalignment of the weld leg misaligned by 1.0-mm with the groove region during the vibration welding process.

FIG. 3D shows the nominal alignment of the weld leg 500 with the sacrificial region 510 below the groove 101 indicating the portion of weld leg 500 that is melted during the vibration welding process. FIG. 3E shows the sacrificial region 510 for a 0.5-mm misalignment, and FIG. 3F shows the sacrificial region 510 for a 1.0-mm misalignment. Comparison of the sacrificial region 510 among FIG. 3D, FIG. 3E, and FIG. 3F illustrates how the size of the sacrificial region 510 increases with increased misalignment. The increase in the size of the sacrificial region 510 due to misalignment causes an increase in melted material during the welding process. Too much melted material in the groove 101 may cause a buildup of excess material that hardens around the weld line (i.e., causes excess flash). By shaping the contour of the groove 101 to displace and/or deform (i.e., bend) the weld leg 500 towards the bottom portion 140 of the groove 101, the groove 101 is configured to direct a misaligned weld leg 500 towards a center of the groove thereby reducing an amount of sacrificial region 510 of the weld leg upon vibrational welding. Reducing the amount of sacrificial region 510 improves the bond formed between components and reduces excess weld flash.

Misalignment may be caused by tolerance variation in the parts to be welded, or from the alignment process, or a combination of both. Misalignment may lead to faulty weld lines which may result in a weakened or failed weld.

The design of the groove 101 provides an improvement for bonding parts together via vibrational welding despite tolerance variations among the parts.

Figure 4:
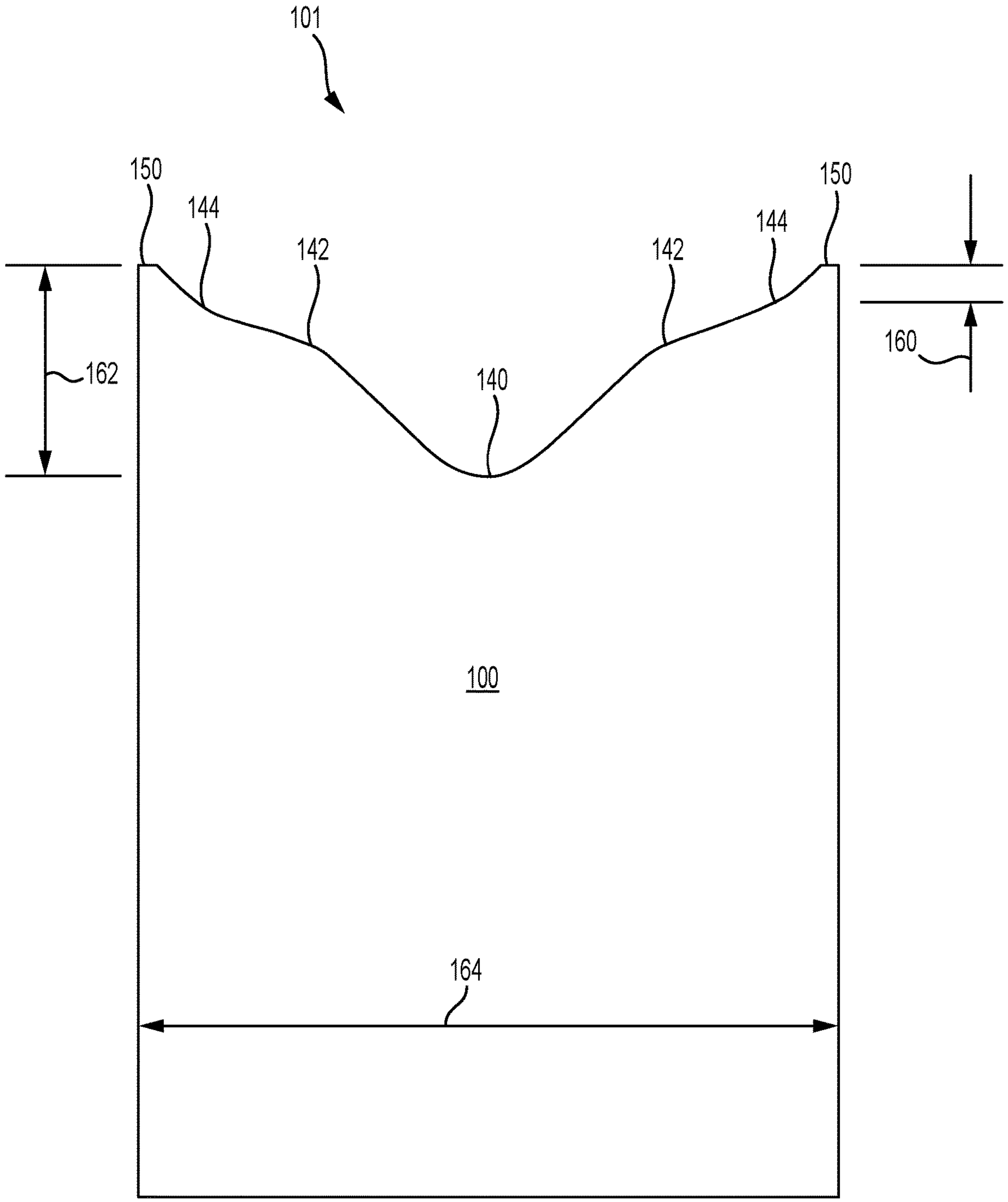
FIG. 4 is a cross-sectional view of the groove region, in an embodiment.

FIG. 4 is the cross-sectional view of the component 100, in an embodiment. The groove 101 may comprise various features designed to improve alignment of the weld leg 500. For example, the bottom portion 140 may comprise a curvature that provides an upwards-facing concave receptacle along a mid-line of the groove configured for receiving a weld leg having a rounded end, such as the rounded end of the weld leg 500 shown in FIGS. 2A to 2D and FIGS. 3A to 3F. The shape of the groove 101 has a cross-sectional profile, as depicted in FIG. 4, which ascends continuously and symmetrically from the bottom portion 140 to the joining surface 150 on opposing sides of the groove 101. Additionally, the cross-sectional profile depicted in FIG. 4 has a smooth undulating shape that lacks: a) any horizontal segments, b) any vertical segments, or c) any corners or other sharp protrusions. Between the bottom portion 140 and top surface 150, a convex hump 142 and a concave depression 144 are formed by the undulating shape of the groove 101. Convex hump 142 serves to nudge the weld leg 500 towards the bottom portion 140 for smaller misalignments, either causing a displacement or deformation of the weld leg 500 toward the mid-line of the groove 101, or a combination of both displacement and deformation. Concave depression 144 serves to cast a wider catchment for the weld leg 500 when larger misalignments occur. The concave depression 144 is located at outer portions of the groove 101 adjacent the top surface 150 on both sides of the groove 101; the convex hump 142 is located on both sides of the groove 101 inside of the concave depression 144 towards the center of the groove 101 (i.e., between the concave depression 144 and the bottom portion 140). A distance 160 is the distance between the top surface 150 and the concave depression 144. In embodiments having a weld leg of about 2.5-mm in length, distance 160 is between about 0.1-mm and 0.3-mm. In an embodiment, the distance 160 is about 0.2-mm. A depth 162 of the groove 101 at the bottom portion 140 may vary depending on the parts being welded. In embodiments having a weld leg of about 2.5-mm in length, the depth 162 is between about 1.0-mm (i.e., about 40% of the weld leg length) and about 1.25-mm (i.e., about 50% of the weld leg length). In one embodiment, the depth 162 is about 1.125-mm (i.e., about 45%). In embodiments, the component 100 has a width 164 of about 3.77-mm, and a width of top surface 150 is about 0.13-mm on either side of the groove 101.

Figure 5:
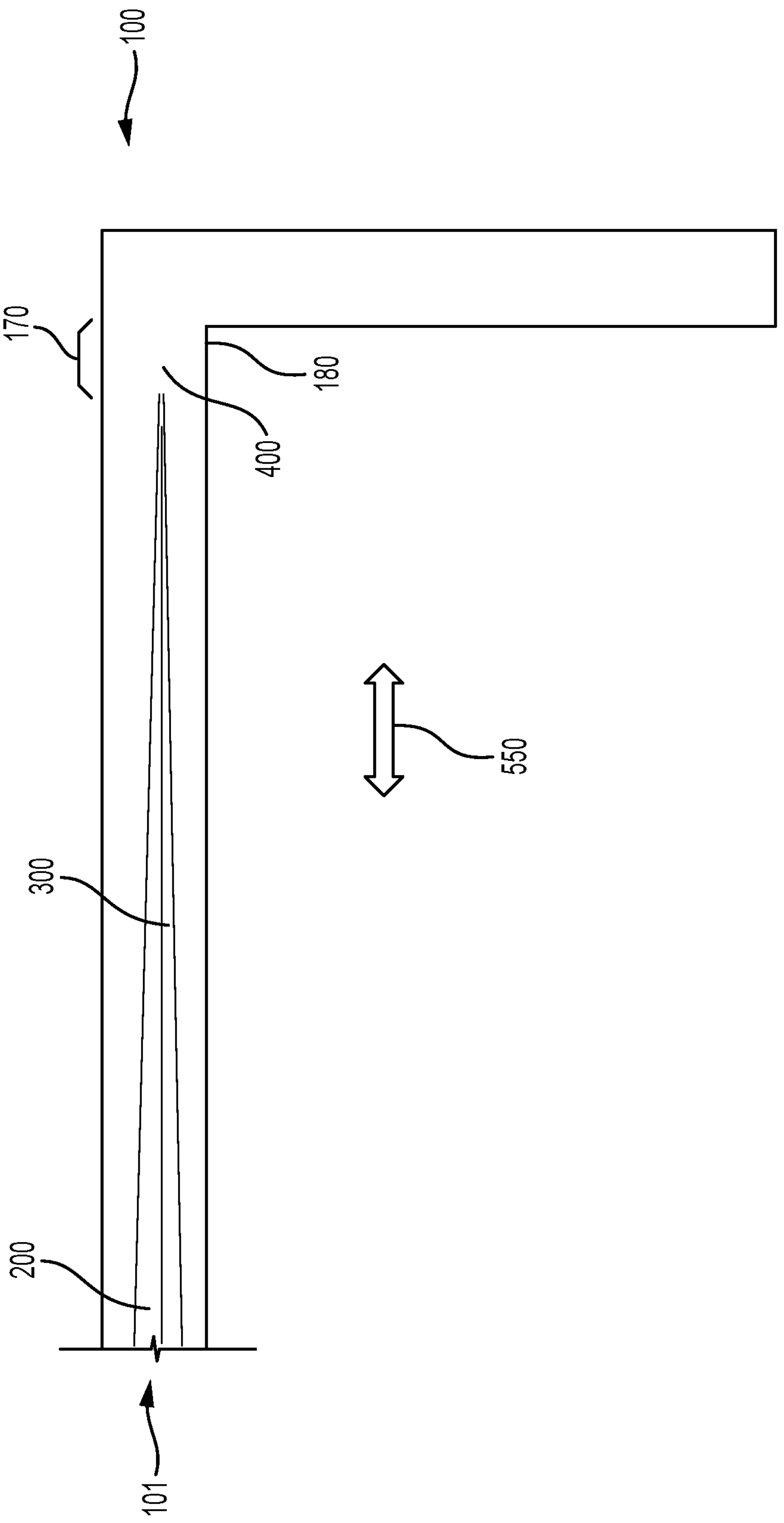
FIG. 5 is a top-down view of an exemplary part having a groove facing up, in an embodiment.

FIG. 5 is a top-down view of an exemplary component 100 having the groove 101. Similar to FIG. 1A, the component 100 includes the base region 400, while the groove 101 includes the fully formed groove in the groove region 200 and the transition region 300 that provides a smooth transition between the groove region 200 and the base region 400. In operation during the vibration welding process, the component 100 slides side-to-side as indicated by the arrow 550 shown in FIG. 5 by an amplitude and frequency configured to generate heat via friction. A gap 170 is provided in the base region 400 between the end of transition region 300 and the corner of the component 100, as depicted in FIG. 5. In embodiments, the gap 170 is between about 1-mm and 5-mm. In certain embodiments, the gap 170 is about 3-mm. The gap 170 is configured to accommodate for an amplitude of 1.5-mm of movement during the vibration welding process. The gap 170 prevents collision between the weld leg 500 and the corner 180, which could result in either the weld leg 500 losing contact with the groove region 200 or a crash between the weld leg 500 with the corner 180 during the vibration welding process.

Figure 6A:
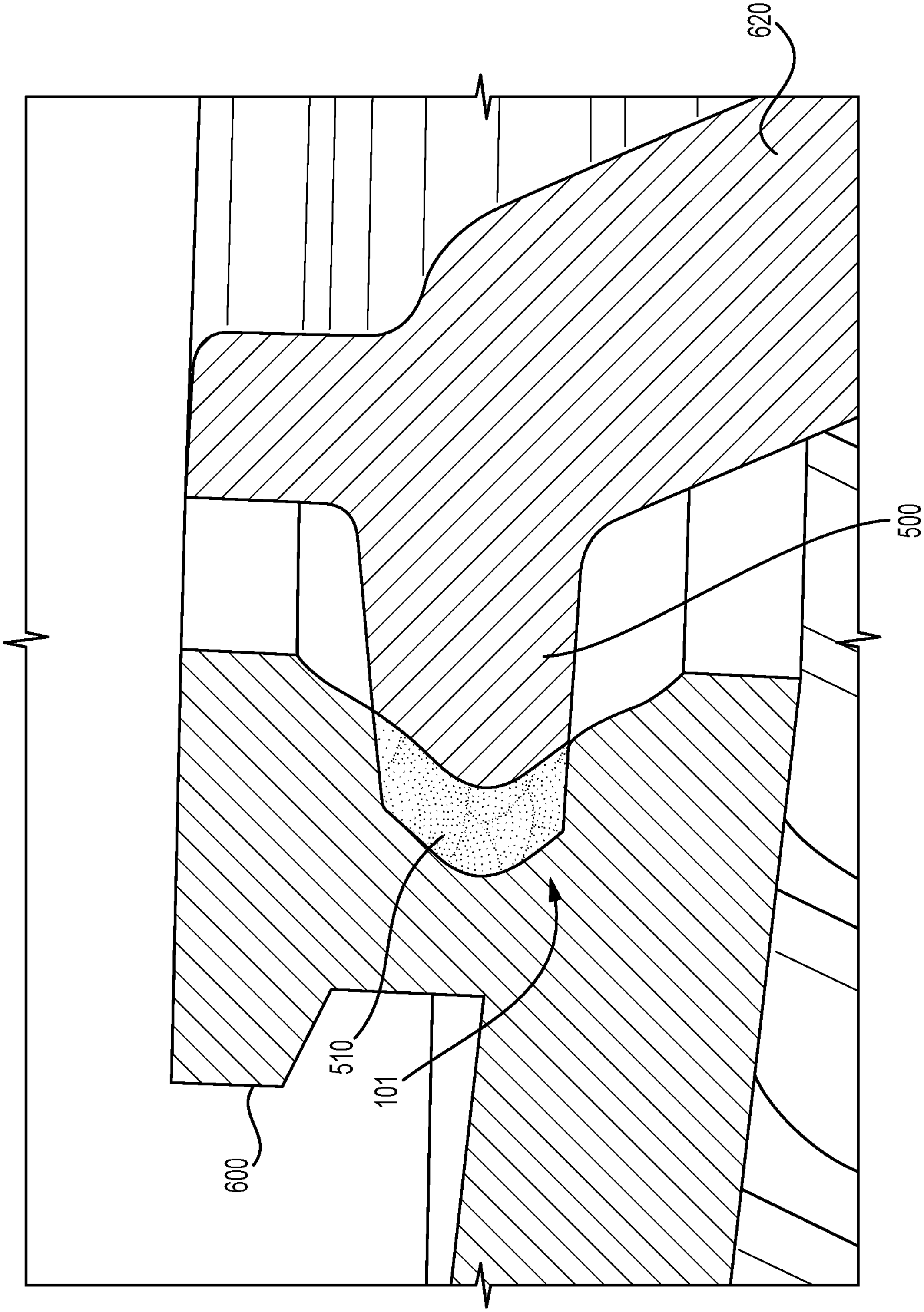
FIG. 6A is a cross-sectional view of an exemplary part having a groove being joined by vibration welding with another part having a weld leg.

FIG. 6A is a cross-sectional view of a first component 600 having a groove 101 being joined by vibration welding with a second component 620 having a weld leg 500. The sacrificial region 510 is melted inside the groove 101 during vibration welding. When the melted material cools, a bonded assembly 650 is formed as shown in FIG. 6B.

Figure 6B:
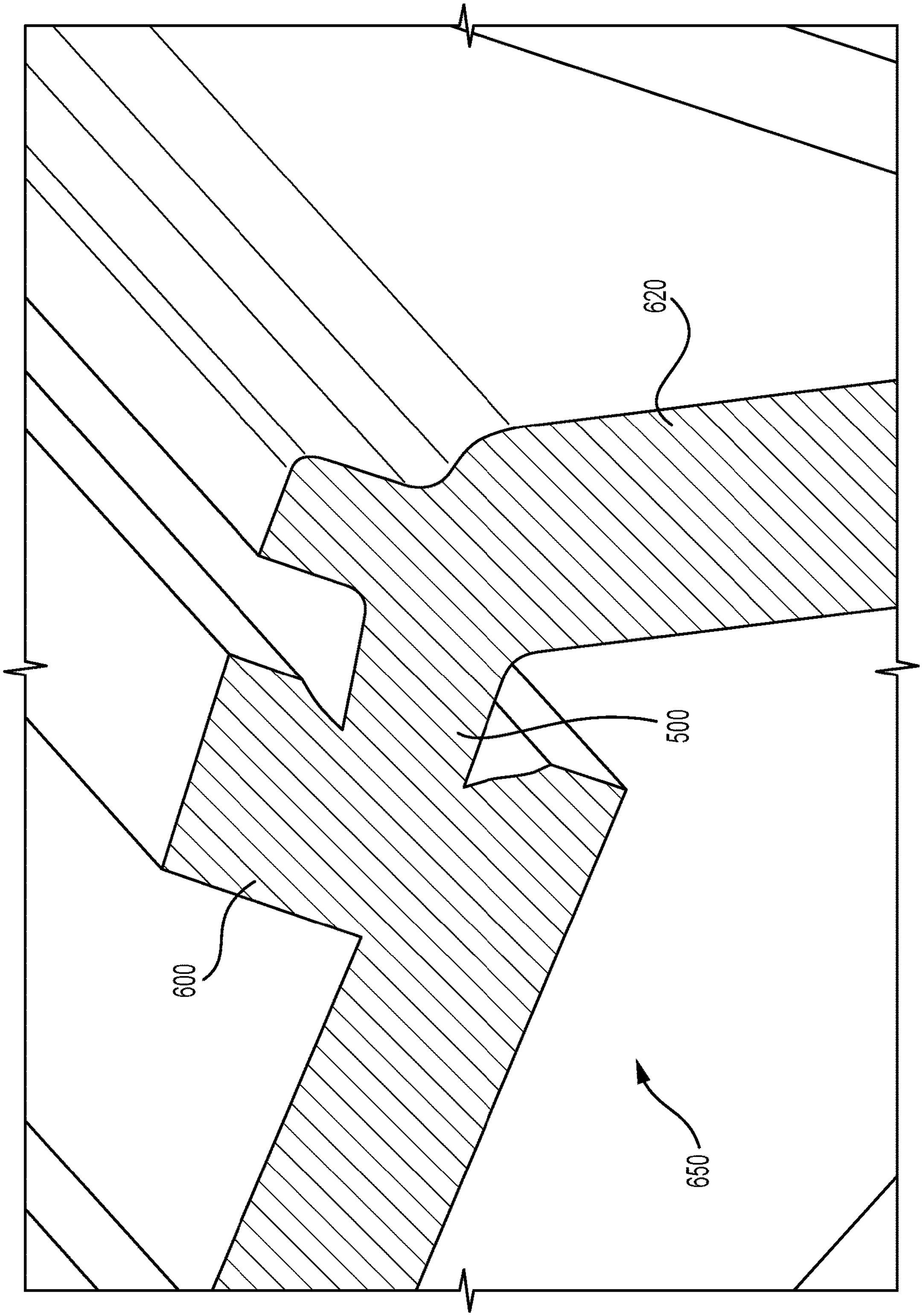
FIG. 6B is a cross-sectional view of a joint region of an exemplary assembly after being joined by vibration welding.

FIG. 6B is a cross-sectional view of a joint region of the bonded assembly 650 following vibration welding of the weld leg 500 into the groove 101. In the bonded assembly 650, a continuous material is formed via the cooled and solidified weld leg 500 that bonds the first component 600 together with the second component 620.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A grooved component shaped for improved bonding of the grooved component with a weld leg via a vibration welding process, the grooved component comprising:

a groove region comprising a groove, wherein the groove region is located in a joining surface of the grooved component;

a base region lacking the groove in the joining surface;

a transition region located in the joining surface between the groove region and the base region, wherein the transition region comprises a smooth transition from the groove region to the base region; and the groove comprises:

a curved bottom portion along a mid-line of the groove; and a cross-sectional profile that ascends continuously and symmetrically from the curved bottom portion to the joining surface on opposing sides of the groove, wherein the cross-sectional profile has a smooth undulating shape that lacks: a) any horizontal segments, b) any vertical segments, or c) any corners or other sharp protrusions;

wherein the cross-sectional profile comprises a concave depression towards an outer portion of the groove adjacent the joining surface and a convex hump between the depression and the curved bottom portion.

2. The grooved component of claim 1, wherein the groove is configured to direct a rounded end of the weld leg towards a center of the groove thereby reducing an amount of sacrificial region of the weld leg upon vibrational welding.

3. The grooved component of claim 2, wherein the concave depression provides a catchment for receiving the rounded end of the weld leg upon misalignment between the weld leg and the curved bottom portion during joining.

4. The grooved component of claim 2, wherein the convex hump is configured to deflect the rounded end of the weld leg towards the mid-line of the groove.

5. The grooved component of claim 1, wherein the convex hump is configured to cause a deformation of the weld leg, thereby bending the weld leg towards the curved bottom portion of the groove.

* * * * *